United States Patent [19]
Lindström

[11] 3,972,158
[45] Aug. 3, 1976

[54] VEGETATION CLEANING UNIT
[75] Inventor: Stig Lindström, Osterjorn, Sweden
[73] Assignee: Jorns Mekan AB, Jorn, Sweden
[22] Filed: Nov. 19, 1974
[21] Appl. No.: 525,128

[52] U.S. Cl. ............................................. 56/13.6
[51] Int. Cl.² ..................................... A01D 55/26
[58] Field of Search ........................ 56/13.6, 503

[56] References Cited
UNITED STATES PATENTS

| | | | |
|---|---|---|---|
| 1,206,642 | 11/1916 | Alchevsky | 56/13.6 |
| 2,625,784 | 1/1953 | Kelsey | 56/13.6 X |
| 2,870,592 | 1/1959 | Swanson | 56/13.6 |

Primary Examiner—Louis G. Mancene
Assistant Examiner—Daniel J. Leach
Attorney, Agent, or Firm—Pollock, Vande Sande & Priddy

[57] ABSTRACT

Apparatus for attachment to and propulsion by a vehicle for the purpose of cutting vegetation, particularly shrubs and small trees. A plurality of generally planar, circular-toothed cutting members are supported on the underside of a housing and with each cutting member positioned in a generally horizontal plane with its forward edge extending forwardly of the housing. The cutting members are so arranged that their toothed cutting edges which extend forwardly of the housing jointly form an unbroken cutting line. The cutters are rotated in such a manner that those cutters which are disposed to the left side of a center line of the apparatus are rotated in a counterclockwise direction while those which lie to the right of the center line are rotated in a clockwise direction, thereby facilitating the conveying of the cut vegetation to either side of the apparatus and away from its center portion.

6 Claims, 6 Drawing Figures

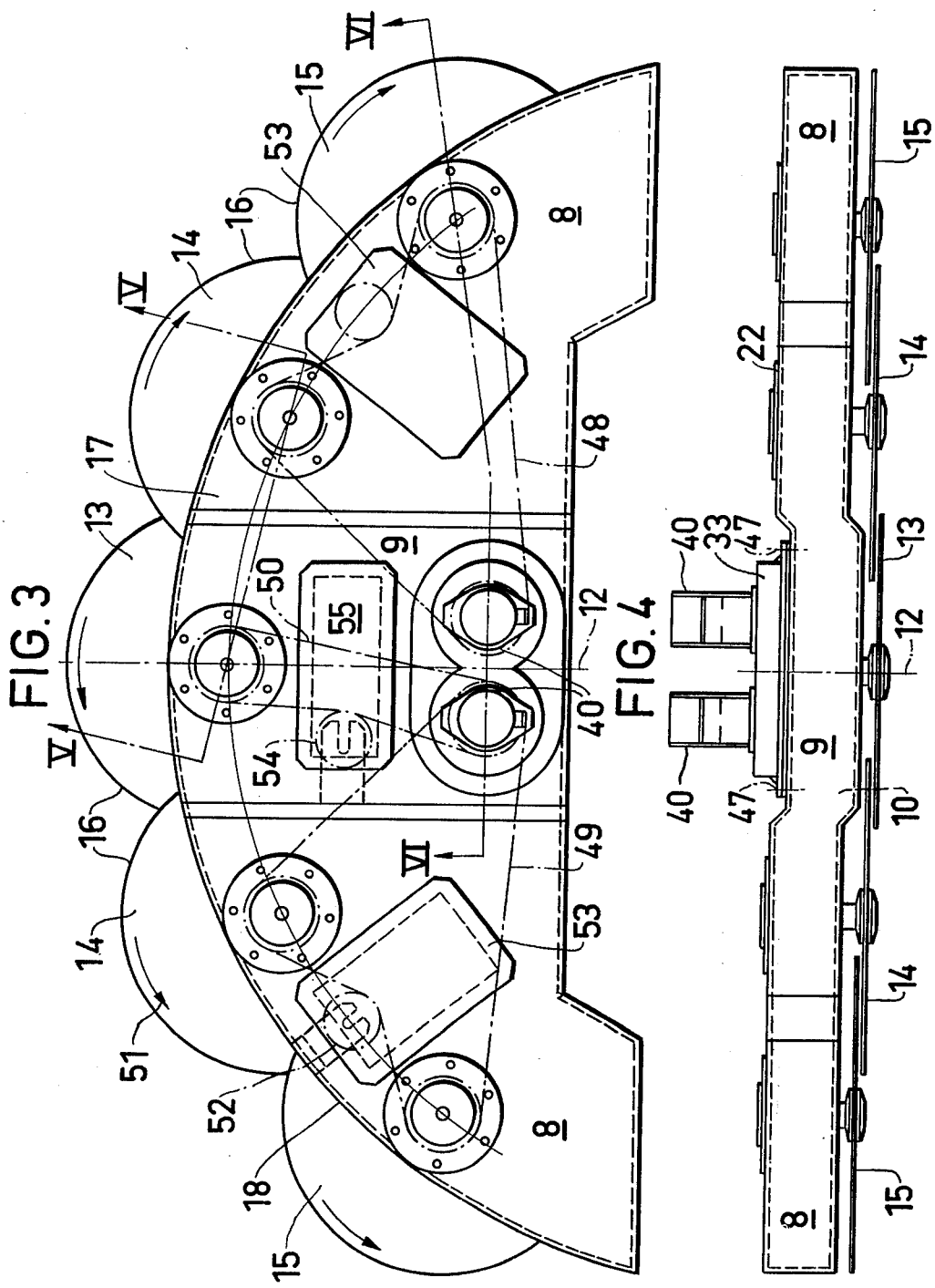

VEGETATION CLEANING UNIT

BACKGROUND OF THE INVENTION

This invention relates to a unit which is connectible to a cross-country vehicle and is adapted to cleam entangled areas, e.g. power lanes in forests, railroad embankments, road embankments, road ditches, cultivated land etc., and also to carry out pre-regeneration and other similar silviculture work.

The growth of thicket, shrub and other vegetation along roads, railroads, in power lanes and elsewhere constitutes a very serious problem, which more recently has also become an environmental problem. Initially, attempts were made to control undesired vegetation manually by means of special tools, e.g. brush saws and the like, but very soon it was found that these tools did not suffice to control the increasing degree of shrubbery with a reasonable and economically justifiable man power investment. Attempts have been made to find other ways of solving this problem, and these have resulted in the development of tree-weeding with arboricides, i.e. the killing of the vegetation by chemical poisonous preparations, which are spread from airplanes or by portable or mobile spray units over the areas requiring treatment.

Tree weeding by arboricides has proved very effective and economically profitable. Therefore, this has become the dominant method for controlling undesired vegetation and, to some extent, has impeded the development of other methods. As great as its advantages may be, however, the cleaning by chemical preparations cannot be utilized for the control of conifers, and more recently this chemical method, involving application of poisons to forests and cultivated land, has encountered heavy criticism. This criticism arises from the fact that the preparations and poisons at present in use, e.g. hormoslyr and amisol, have, in the opinion of many persons, detrimental effects on human beings as well as animals and may also have long-time effects, so far unknown, which are a direct danger to the environment. This argument is deemed to provide sufficient reason to forbid any use of hormoslyr, amisol and other similar poisons as cleaning agents, at least until these poisons are proved to have no such detrimental effects. In the event of a ban of such poisons as cleaning agents, the situation will be the same as before the introduction of the chemical treatment, because there exist at present no alternatives to the chemical method although several attempts have been made to produce an efficient cleaning machine, for example, by applying the same principles as for mowing-machines and lawn-mowers. These attempts, however, have not yielded any concrete results so far.

SUMMARY OF THE INVENTION

The present invention, therefore, has the object to provide a mechanical alternative to the chemical cleaning method which renders it possible to clean and even thin both large and small areas in an efficient, and economic manner, without the use of poisons and without requiring excessive manpower.

BRIEF DESCRIPTION OF THE DRAWINGS

The invention is described in greater detail in the following by way of an exemplifying embodiment and with reference to the accompanying drawings, in which:

FIG. 3 is a horizontal view of the unit, FIG. 4 is a view from behind the unit shown in FIG. 3.

DETAILED DESCRIPTION OF THE PREFERRED EMBODIMENT

Figure 1:
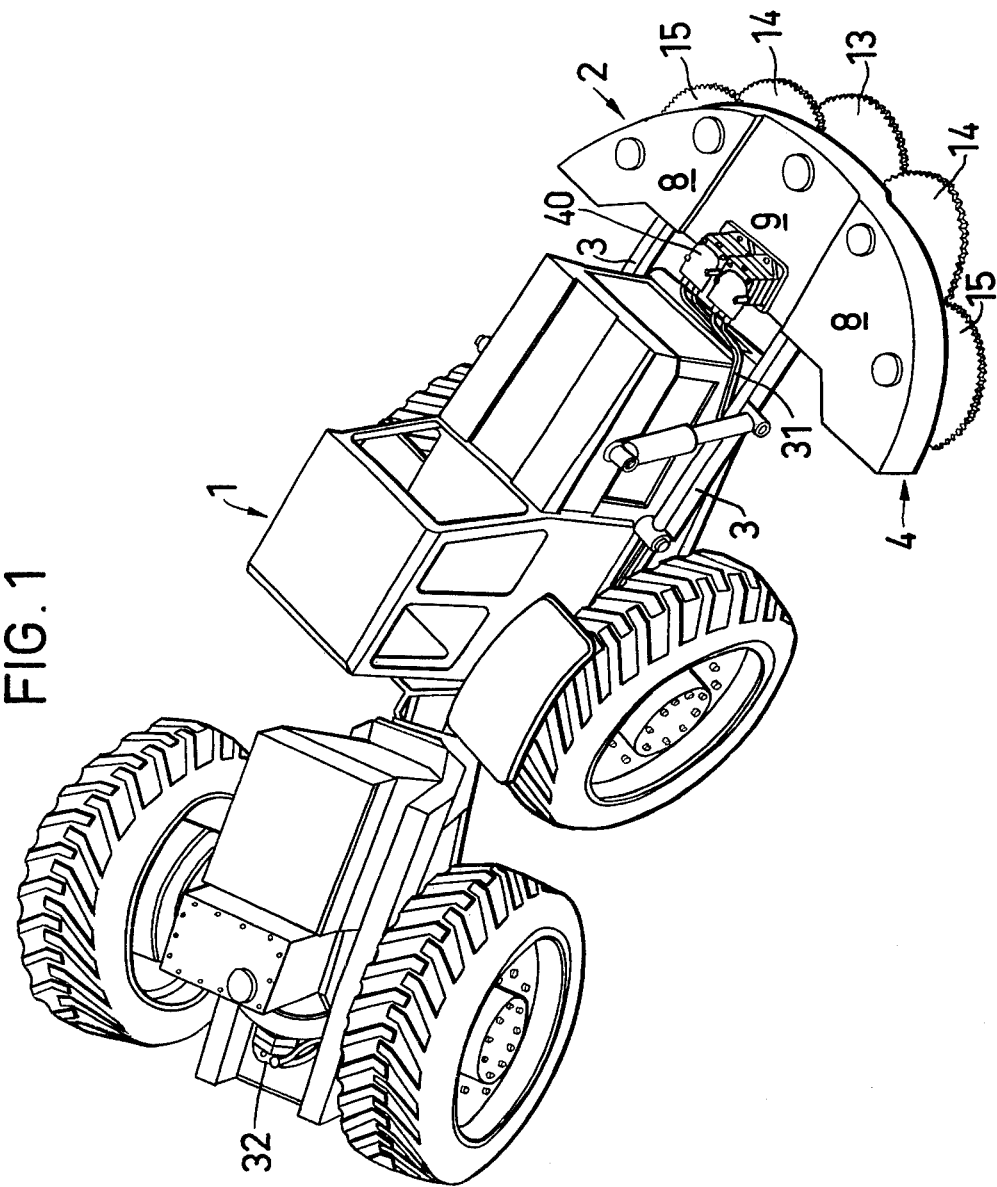
FIG. 1 is a perspective view of the preferred embodiment of the unit according to the invention which is mounted on an articulated cross-country vehicle of the tractor type.

The embodiment of the cleaning unit according to the present invention as shown in the drawings is intended to be advanced by a cross-country vehicle, which may be of the crawler or wheeled type known per se. In FIG. 1 is shown a wheeled tractor 1 of the articulated type as the carrier of the unit 2 according to the selected embodiment, which is carried in front of the tractor by means of hydraulically liftable and lowerable arms 3 actuated from the driver's seat. Instead of said arms 3, so-called parallel guide rods may advantageously be used which permit adjustment of the position of the cleaning unit in relation to the ground as the unit is being lifted and lowered and thus maintain the unit substantially horizontal.

The cleaning unit proper comprises a box-shaped frame 4 consisting of an upper plate 5 and a lower plate 6, which are united with each other at the periphery by means of edge plates 7 extending all around the frame in such a manner that a sealed space is formed within the frame 4 which thereby also can serve as a transmission housing. The frame 4 can be divided into two outer portions 8 and a central portion 9 (FIG. 3) therebetween, which is located lower than the rearwardly extending outer portions 8, so that the lower plate 6, or more correctly its portion associated with the central portion 9 of the frame, forms by said lower arrangement an oil trough 10 for lubricating oil.

Figure 5:
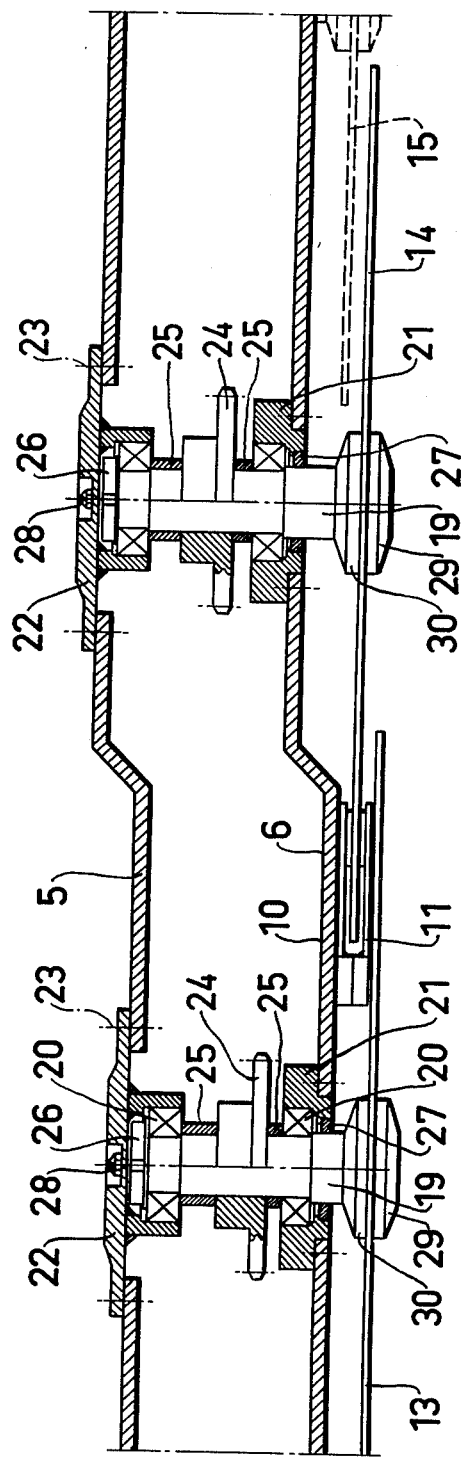
FIG. 5 is a section along the line V—V in FIG. 3.

The frame 4 is built symmetrically about the longitudinal axis of the unit having the designation 12 in FIGS. 3 and 4 and carrying at its forward edge in the driving direction a number of toothed and preferably similar cutting members 13, 14 and 15, which in the embodiment shown are blades, but which in other embodiments of the invention may be saw chains or the like. The cutting members, however, must be constructed and so located in relation to each other to form a coherent or unbroken tooth or cutting line 16 (FIG. 3). Thus, in the embodiment shown, the blades overlap each other and are guided at the periphery by means 11 preventing slewing and slanting, as especially shown in FIG. 5. With an odd number of cutting members, which is to be preferred to an even number, the cutting member 13 located foremost in the driving direction has its center disposed on the symmetry line 12, while the remaining cutting members 14 and 15 are arranged symmetrically on both sides of the symmetry line and closer to the rear edge of the unit than the preceding cutting members. The cutting members 13–15 in the embodiment shown in the drawings are disposed with their center on a curved line 17, which is shown as being parallel with the forward edge line 18 of the frame. Both said edge line and the line, on which the cutting members are arranged, may, however, have a configuration other than that shown and need not be in parallel with each other. The distance of said lines relative to each other is to be chosen with regard to the size of the cutting members and the desired cutting depth. Also, their configuration should be such that, irrespective of whether they are straight and /or curved, that at each point on the respective line a tangent thereto forms an angle with the symmetry line 12 which is within the range from 0° to 90° for that portion of the unit which faces in the driving direction or in the main feed direction for the unit. Said angle, along the greater part of the respective line, must be acute, i.e. be greater than 0° and smaller than 90°. At the point of intersection, and near to it and the outer end points, however, the angle may be 90° and, respectively, 0°, as shown in the drawings. In the embodiment shown, with a unit substantially semicircular, the entire unit faces in the driving direction, but according to the invention the unit also may have plough-shape or oval, circular, square or rectangular shape, the cutting members in the four last-mentioned cases being uniformly distributed about the whole periphery, or it may have a shape comprising two reversed halves.

In order to bring about the overlapping between the cutting members 13–15 having the form of blades, the blade 13, which in the embodiment shown is located centrally and farthest ahead, is suspended at a lower level than the adjacent blades 14, which blades 14 in their turn are suspended on a level lower than that for the next following blades 15, and so on. It is also possible, within the scope of the invention, to place the blades designated by 14 lower than the adjacent blades 13 and 15 and also to place the outer blades 15 lower than the blades 14, and so on. With an even number of blades, the two blades which are located foremost in the driving direction then overlap each other, and such two blades are then disposed with their center symmetrically offset on either side of the symmetry line and on different levels, while the remaining blades may be arranged in the way shown in the drawings and described above, and are, of course offset obliquely rearward as much as required. The blades 13–15 are each suspended from an axle 19 projecting freely from the lower surface of the unit, which axles are mounted within the frame, so that the lower surface can be manufactured to be smooth, without any mountings or other projections except the axles 19 to obstruct the shrubs and other vegetation cut off and taken along by the rotary blades and which might otherwise pass between the blades and the lower side of the unit. As a result, there is much less risk of jamming and clamping.

Figure 6:
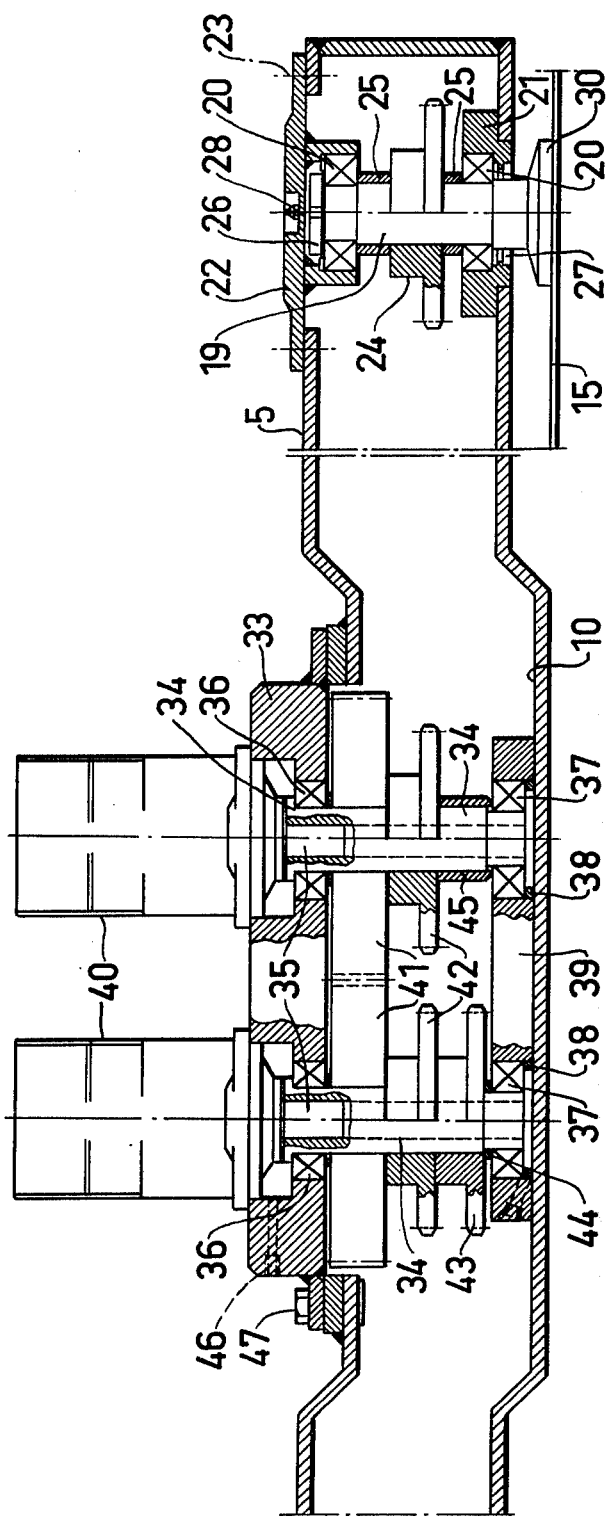
FIG. 6 is a section along the line VI—VI in FIG. 3.

All the blades 13–15 and their axles 19 are suspended and mounted in the same manner and, therefore, in the following description, the suspension and mounting of only one blade is described with reference to FIG. 6. The axle 19 of each blade is mounted and suspended within the frame 4 by means of two ball bearings 20, each of which is disposed in a bearing housing 21 and 22. The bearing housing 21 is fastened in an opening in the lower plate 6, and the bearing housing 22 is fastened in an opening in the upper plate 5 which is of such a size, that the axle 19 with the members thereon and the bearing housing 21 can be taken out of the frame, after the blade has been removed from its axle and the screws indicated schematically at 23 which hold the bearing housings 21 and 22 have been removed. A sprocket wheel 24 is mounted non-rotatively between the bearings 20 on the axle 19 and held in place by means of two spacer sleeves 25 located one on each side of the sprocket wheel. The axle 19 is locked at its upper end by a lock nut 26 and at its exit from the bearing housing 21 is surrounded by a sealing ring 27. A grease nipple 28 is provided for the upper bearing 20. The lower bearing is intended to be lubricated with oil from the oil trough 10 by splash lubrication. The axle 19, furthermore, at its downwardly directed end is formed with a pin, not shown in detail, on which the blade is supported and retained in known manner by means of a nut 29 which is locked aganist being inadvertently removed and which holds the blade clamped against a thrust 30 formed on the axle. In the embodiment shown, with a sunk central portion 9, the axles 19 for the blades 13 and 15 have equal length while the axles of the remaining blades are slightly longer, as appears particularly from FIGS. 4 and 6.

For operating the cutting members, two hydraulic motors 40 are provided which, via hoses, see FIG. 1, are driven from a hydraulic pump 32 on the tractor 1. The motors are located at the rear postion 9 so as to be protected as effectively as possible and not obstruct the vegetation, e.g. shrubs and the like, cut off by the cutting members as it is being led off and moved away. The two motors 40 are supported (FIG. 6) by a motor flange 33, which is disposed over an opening in the upper plate 5 and secured by screws 47 screwed into the frame 4 at the side of the opening. Each of the extended drive shafts 34 of the motors which in the embodiment shown, are connected non-rotatively to the outgoing shaft journal 35 of the respective motor, is supported at one end in a ball bearing 36 provided in the motor flange 33 and at its other end in a ball bearing 37, which is supported by a distance ring 38 abutting the lower plate 6 and located in a bearing holder 39, which is common to the lower bearings 37 of both motors and fastened on the lower plate 6 of the frame. On each motor shaft 34, furthermore, a gearwheel 41 is mounted non-rotatively, which wheels coact with each other for synchronizing the motors 40 a sprocket wheel 42 is disposed on the same level as the sprocket wheels 24 on the axles 19 for the blades 14 and 15. On one motor shaft 34, moreover, an additional sprocket wheel 43 is mounted non-rotatively which is disposed on the same level as the sprocket wheel 24 on the axle 19 for the forward blade 13 and is supported by a spacer sleeve above the bearing 37 in the bearing holder 39. On the motor shaft 34 with only one sprocket wheel, this wheel is held in place by a spacer sleeve 45, which rests against the bearing 37 in the bearing holder 39. When an even number of blades is provided, the two motor shafts 34 are each provided with two sprocket wheels. Grease nipples 46 are provided for the bearings 36 and 37.

Figure 2:
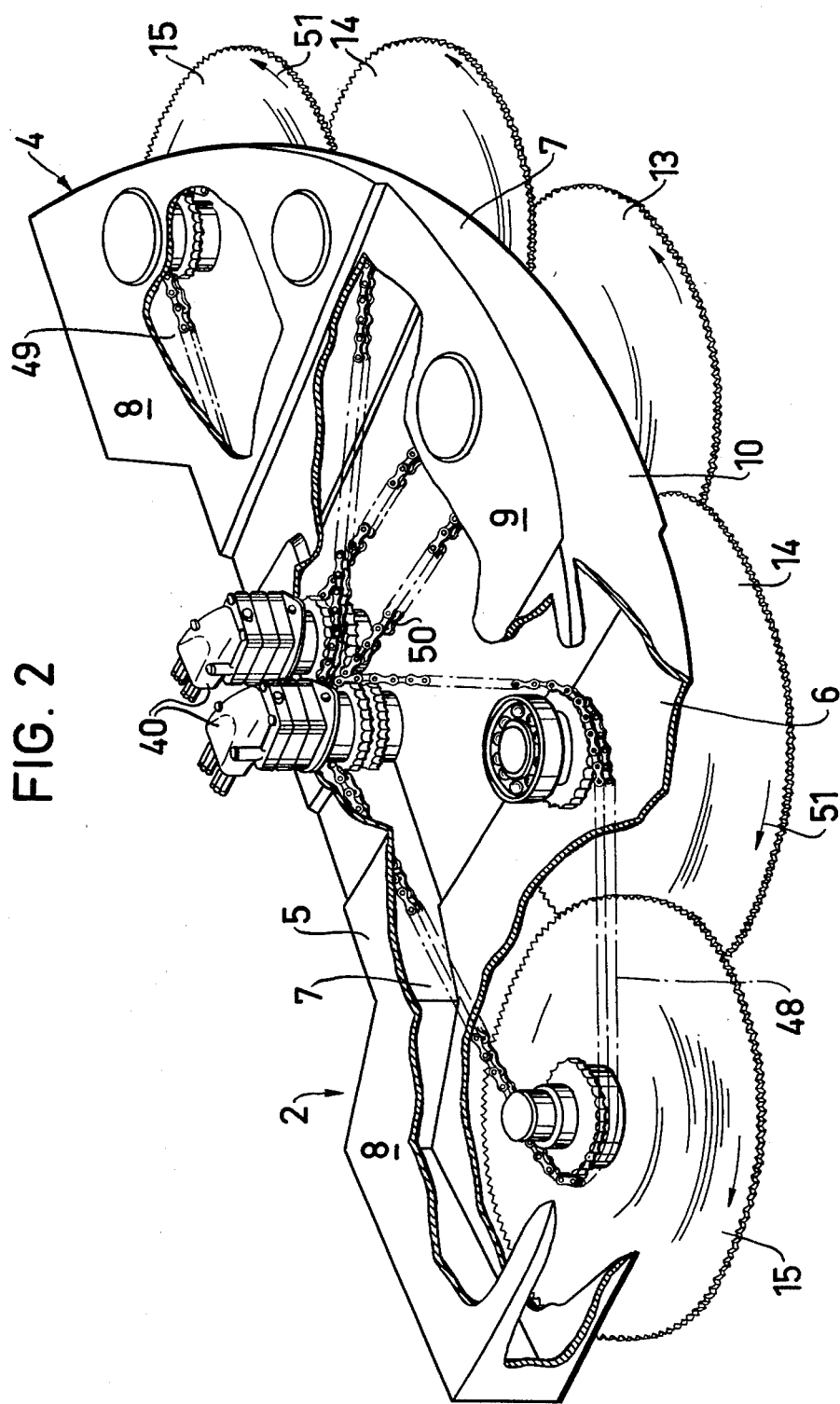
FIG. 2 is a perspective view of the unit proper, partially cut open to illustrate certain details in the unit interior.

The two motors 40 synchronized by the gearwheels 41 are arranged to operate in opposed directions and to drive different cutting members. More precisely, the motor disposed to the left of the symmetry line in FIG. 2, and to the right of the symmetry line in FIG. 3, is drivably connected by a chain 48 with the cutting members 14 and 15 located on the same side as their motor, and the other motor is drivably connected with the cutting members 14 and 15 located on the same side as their motor and with the forward cutting member 13, by means of chains 49 and 50, respectively. The rotational directions of the motors is such that the cutting members at their portion located outside the frame rotate in a direction outwardly to the edges, as shown by the arrows 51 in FIGS. 2 and 3. The forward cutting member in an embodiment having an odd number of cutting members, as shown, can rotate in one or the other direction, although this cutting member is shown in FIGS. 2 and 3 to have the same direction of rotation as the cutting members to the left of the symmetry line, seen in the driving direction, i.e. counter-clockwise. Owing to the rotational direction of these cutting members, the vegetation cut off by the rotating cutting members is forced out of the cutting area and outwardly to the edges and thereby effects an efficient removal of cut-off vegetation and also is self-cleaning.

For stretching the chains 48 and 49, and in order to provide the necessary length of engagement between said chains and, above all, the sprocket wheels 24 of the outer cutting members 14 and 15, an idler wheel 52 is provided between the axles of the cutting members 14 and 15, which wheel is accessible through an opening in the upper plate 5 covered by a cover 53 screwed onto the upper plate. An idler wheel 54 is provided for the chain 50 between one of the drive motors 40 and the forward cutting member 13 and is accessible through an opening covered by a cover 55 screwed onto the upper plate, as shown particularly in FIG. 3. The idler wheels 52 and 54 must be loaded, e.g. by means of a spring or hydraulically, and movable against the load to protect the chains against sudden and heavy load stresses.

The present invention is not restricted to the embodiment described above and shown in the drawings, but can be modified in many different ways within the scope of the invention as defined in the claims. It is possible, for example, instead of blades to utilize as cutting members one or more saw chains and to design the unit so as to have one of the aforesaid shapes, and above all to give the frame a round shape and to arrange the cutting members, preferably an odd number thereof, with their center on a circle line inside of the circular outline of the frame, and uniformly spaced along said line so that the cutting members overlap each other form a coherent or unbroken tooth or cutting line around the whole periphery, and with all the cutting members being driven via one or more chains by a single motor disposed on the unit. In such and similar embodiments of the cleaning unit according to the invention, it is possible and suitable to suspend the unit in a controllable manner, for example in the same way as a timber grapple, on a jib, a telescopic extension boom or the like, mounted on the vehicle and capable of rotating the unit through 360°, thereby rendering it possible for the unit to carry out selective cleaning in existing forests.

What I claim is:

1. Apparatus for attachment to and propulsion by a vehicle to cut vegetation particularly shrubs and small trees, said apparatus comprising:
    a housing,
    a plurality of generally planar circular toothed cutting members,
    means supporting said cutting members on the underside of said housing in a generally horizontal plane and with the forward edge of each cutting member in the forward direction of movement of the apparatus extending forwardly of said housing, said supporting means so supporting said plurality of cutting members that their toothed cutting edges which extend forwardly of said housing jointly form an unbroken cutting line,
    and means for rotating each of said cutting members, said rotating means rotating those cutting members whose rotational axis lie to the left side of a center line of the apparatus in a counterclockwise direction and those cutting members which lie to the right of the center line in a clockwise direction so that said cutters tend to convey the cut vegetation away from the center portion of the apparatus.

2. The apparatus of claim 1 in which said supporting means supports said cutting members with each more centrally disposed cutting member being located forwardly of an adjacent more laterally outwardly disposed cutting member.

3. The apparatus of claim 1 in which the forward edge of said housing is curved with its central portion lying forwardly of its laterally disposed portions lying to either side of its central portion.

4. The apparatus of claim 1 in which said cutting members overlap each other.

5. The apparatus of claim 1 which further includes means for preventing slewing and slanting of a cutting member relative to an adjacent cutting member.

6. The apparatus of claim 1 which includes an odd number of said cutting members, one of said members having its axis of rotation on an axis of symmetry of said apparatus and the remainder of said cutting members having their axis of rotation disposed in pairs symmetrically on opposite sides of said axis of symmetry.

* * * * *